Aug. 8, 1961  R. H. HORKY ET AL  2,995,014
DUAL ELECTRO-HYDRAULIC SERVO ACTUATOR SYSTEM
Filed April 26, 1960
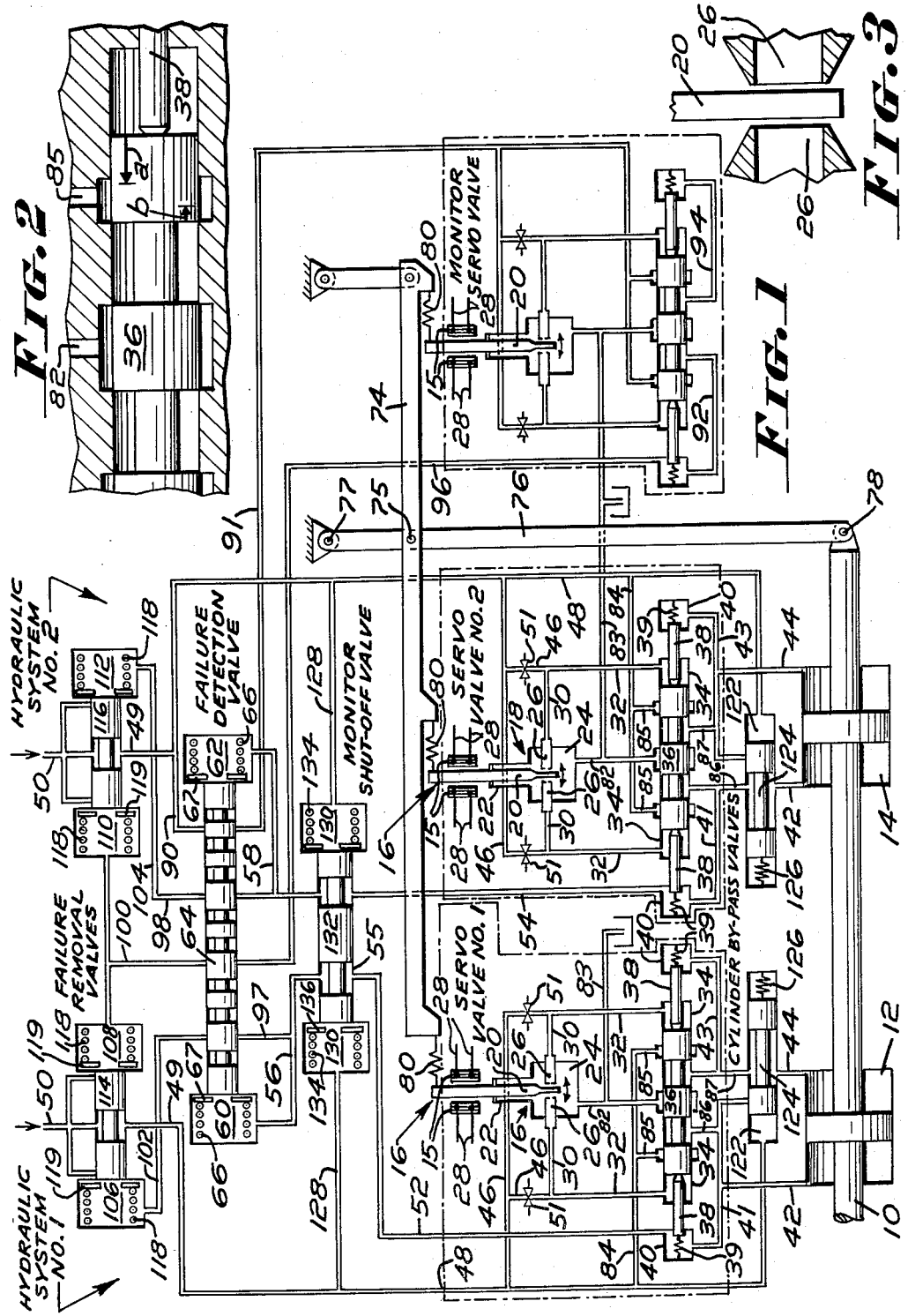

United States Patent Office 2,995,014
Patented Aug. 8, 1961

2,995,014
DUAL ELECTRO-HYDRAULIC SERVO ACTUATOR SYSTEM
Raymond H. Horky, Niagara Falls, and Martin P. Wolpin, Tonawanda, N.Y., assignors, by mesne assignments, to Bell Aerospace Corporation, Wheatfield, N.Y., a corporation of Delaware
Filed Apr. 26, 1960, Ser. No. 24,843
10 Claims. (Cl. 60—97)

This invention relates to servo control systems of the parallel component type employing combinations of hydraulic, mechanical and electrical mechanisms.

It is an object of the present invention to provide an improved control system as aforesaid embodying means automatically operable to insure proper functioning of the apparatus notwithstanding operational failure of a component thereof.

Another object of the invention is to provide an improved control system as aforesaid, which is of otherwise improved reliability in operation. Other objects and advantages of the invention will appear in the specification hereinafter.

In the accompanying drawing:

FIG. 1 is a schematic illustration of a control system of the present invention; and FIGS. 2 and 3 are enlarged scale fragmentary views of details of the mechanism of FIG. 1.

As shown herein by way of one exemplificaiton of the invention, the apparatus is illustrated to provide means for controlling a plurality of fluid motors to impart reciprocatory motions to a power output push-pull member designated 10 and which is common to all of such motors. In the specific structure shown in the drawings, member 10 conveniently comprises the piston rod element of a dual piston-cylinder unit including cylinders 12, 14. Thus, the rod 10 is arranged to be powered by a pair of pistons, the cylinders 12 and 14 of which are separately supplied by hydraulic fluid pressure systems designated numbers 1 and 2 at the top portion of the drawing. In practice, the hydraulic systems 1 and 2 may in turn be supplied from different power sources, or if preferred, may be coupled to a common fluid pressure supply source. The cylinders 12, 14 are arranged to be separately supplied by servovalve mechanisms Nos. 1 and 2, as illustrated in FIG. 1 of the drawing herewith.

The function of the apparatus is to cause the rod 10 to take a position proportionately related to the magnitude and sense of an applied electrical control signal. This signal is arranged to be supplied in the form of electrical currents through conductors leading to solenoids 15, 15, 15, 15 such that the net current received by servo valve No. 1 is equal to that received by servo valve No. 2. At each servo valve the solenoids 15 are arranged to create torques on a pilot valve arrangement as indicated at 16, 18. Torques may also be supplied to the pilot valves by deflecting springs 80, 80. The deflection of these springs is determined by the position of a push-pull link 74 which is driven by piston rod 10 with which the air of link 76 or similar suitable means. Thus it will be appreciated that the torques created by springs 80, 80 can be a measure of the magnitude and sense of the position of the piston rod. By suitably machining these spring developed torques with the electrically developed torques the net torques applied to the pilot valves can be reduced toward zero when the piston rod 10 reaches the position called for by the electrical signal. The net torque applied to each pilot valve is then a measure of the error between the desired and actual outputs of the apparatus, and for this reason this torque may be referred to as the error torque or error signal. Thus, the system is arranged so that when an error signal exists the servo valve will cause the pistons in cylinders 12 and 14 to move to reduce the error; and when the error signal is reduced to or near zero the servo valves will cause the pistons in the cylinders 12 and 14 to be held at the desired position.

In the case of the embodiment shown herein each pilot valve comprises a member 20 designated as the "flapper," which is fulcrummed upon and supported by a flexible fluid-tight collar 22. The flapper may be acted upon by magnetically induced torques such that the spring effect of the collar is essentially cancelled, thus permitting the flapper to be readily moved under the influence of very small error torques. The output end of the flapper extends between two oppositely disposed circular openings or nozzles 26, 26, which are so positioned as to permit a limited motion of the flapper, as shown in FIG. 3. This arrangement provides a pair of differentially variable capacity cylindrically-shaped fluid flow passageways in the spaces between the flapper and the nozzles, and permits the fluid pressures at the nozzle tips to develop a torque on the flapper. Hydraulic fluid is supplied to the nozzles from an external pressure source by way of conduits 50, 48, 46, 32, 32, 30, 30 and through non-variable flow restrictive orifices 51, 51 located in conduits 32, 32. In each case fluid from the nozzles 26—26 enters chamber 24 and is then returned to the external hydraulic system by way of conduits 82, 83. When the flapper is at a position midway between the nozzles the fluid flows through each orifice-nozzle pair at equal rates. The pressure lost across each orifice is then the same, and identical pressures exist within the nozzles. When the flapper is displaced from the mid-position as shown, the resulting change in flow resistance at each nozzle differentially alters the flow through each orifice-nozzle pair thus creating unequal pressure losses across the orifices and hence different pressures within the nozzles. Thus, as the flapper moves toward one nozzle under the influence of an error signal the increased flow resistance reduces the flow through the corresponding orifice thereby reducing the orifice pressure drop and increasing the pressure within the nozzle. A converse action takes place in the opposite nozzle, thus creating an increasing differential pressure in conduits 30, 30, which is reflected at the nozzle tips so as to develop a torque opposite to the error torque. In this manner the flapper will seek a position such that the differential pressure between conduits 30, 30, which is the output of the pilot valve, will reach a magnitude proportional to the value of the error signal.

The pilot valve output is communicated by extensions of conduits 32, 32 to corresponding chambers 34, 34 at opposite ends of the power control spool 36 of the servo valve. The spool 36 is arranged to be normally centered in its sleeve by means of opposed end pins 38, 38 backed up by preloaded compression springs 39, 39 disposed in fluid chambers 40, 40. As shown in the enlarged fragmentary section of FIG. 2 the spool and its sleeve forms four restrictive flow passages which may be varied by motion of the spool. Hydraulic fluid is supplied to the spool from an external pressure source by way of conduits 50, 48, 84, 85. When the spool of servo valve 1 is displaced toward the right fluid may flow through conduits 84, 44 into the right portion of cylinder 12 so as to cause motion of piston rod 10 toward the left. This same movement of the spool permits fluid from the left hand portion of cylinder 12 to return to the external hydraulic system by way of conduits 42, 41, 86, 82 and 83. In like manner the piston rod may be moved toward the right by reversing the direction of spool displacement. The operation of the piston rod 10 in cylinder 14 is similarly governed by the displacement of the spool of servo valve No. 2.

Chambers 40, 40 are connected by means of conduits 41, 43 to conduits connecting the cylinder and power control spool. Thus, at any time differential pressures exist within the cylinders due to a load on rod 10, they are reflected back to spool 36 by means of hydraulic forces applied through pins 38. It is readily seen, by considering the balance of forces on the spool, that the differential force created in chambers 34, 34 by the error signal will be balanced by the differential force from springs 39, 39 due to spool deflection and by the cylinder load pressure differential. In this manner the load synchronization of the piston within cylinder 12 with the piston within cylinder 14 is maintained despite nominal variation in the characteristics of either servo valve. Consider, by way of example, that the spool 36 of valve 2 is displaced a bit further to the right than that of valve 1 in response to identical electrical inputs to each pilot valve. Initially, the piston in cylinder 14 will attempt to assume a greater load than the piston in cylinder 12 due to the lowered resistance to flow at the spool, while the piston in cylinder 12 will attempt to resist this effect thus decreasing its share of the load. These effects are sensed by the cylinder pressure chambers 40 such that valve 2 a force is developed which acts to reduce the opening of the spool while ta valve 1 the spool opening is increased. In this way the flow resistance of the two spools is brought into closer agreement and the load distribution between both hydraulic systems is improved. This use of cylinder load feedback by means of chambers 40 is especially important and effective when the spools are required to remain at or near their neutral position, since at this position very large differences in load pressure output may otherwise be obtained with minute variations in spool deflection resulting in the development of large load differences between the cylinders. In this apparatus, therefore, the cylinder pressures in cylinder 12 will normally be approximately equal to the corresponding cylinder pressure in cylinder 14.

Should there at any time develop a significant shift inload between cylinders 12 and 14 an abnormality of operation in either hydraulic system is indicated. Such abnormality may be due to, but is not limited to, any of the following possibilities. An opening in conductor 28 or solenoid 15; a failure of spring 80; excessive flow restriction at orifice 51 or nozzle 26, or at protective filters if provided, due to contaminating particles in the hydraulic fluid; restricted motion of flapper 20 due to mechanical failure of collar 22 or particles at nozzle 26; failure of spring 39; or failure of spool 36 due to seizing or due to excessive friction forces caused by fluid borne contamination. The presence of any such abnormality may be detected by continually monitoring the cylinder pressures. In the embodiment of the apparatus shown herein the left side of cylinder 12 is communicated to chamber 60 of the failure detection valve via conduits 42, 41, 52 and 56. In a similar manner the left side of cylinder 14 is communicated to chamber 62 of the failure detection valve via conduits 42, 86, 41, 54, 58. Chambers 60 and 62 are so disposed with respect to spool 64 that pressure differences between the corresponding cylinder sections will cause a differential force on this spool. Springs 66, 66 and washers 67, 67, located in chambers 60, 62 are so arranged that the motion of spool 64 is prevented until the magnitude of the cylinder pressure discrepancy is large enough to overcome the spring preload.

The spool 64 may move in either direction due to a malfunction, and as it does so external hydraulic pressure is admitted via conduits 50, 90, 91 to the pilot valve and power control spool of the monitor servo valve which is identical in all respects to servo valves Nos. 1 and 2. The monitor servo valve is not connected to the cylinder, but by means of solenoid coils 15 and feedback spring 80 it is arranged to receive the same error signal expected at the operating valves. Thus the pressure created in conduit 92 is the same as that normally expected in conduits 41—41. As further motion of spool 64 results from the abnormal cylinder pressure difference the pressure in conduit 56 is conducted via conduits 97, 102 to chamber 106; the pressure in conduit 96 is conducted via conduit 100 to chambers 108, 110; and the pressure in conduct 58 is conducted via conduits 98, 104 to chamber 112. Chambers 106 and 108 are so disposed with respect to spool 114 of the failure removal valve in hydraulic system No. 1 that pressure differences between the corresponding output conduit of servo valve No. 1 and the monitor servo valve will cause differential force on spool 114. In a similar manner pressure differences between the corresponding output conduits of servo valve No. 2 and the monitor servo valve will cause a differential force on spool 116. Springs 118, 118, 118, 118 and washers 119, 119, 119, 119 located in chambers 106, 108, 110, 112 are so arranged that the motions of spools 114, 116 are prevented unless the magnitudes of the pressure differences are large enough to overcome the spring preloads.

The failure removal valves serve as a means of comparing the operability of the working servo valves with the monitor servo valve which is powered only when abnormal operation is detected. Since all servo valves receive the same error signal the outputs should be approximately the same unless the valve is affected by an abnormal condition. Thus, for example, should the sourc of failure be within hydraulic system No. 1 the spool 114 will move while spool 116 will remain in its normal position. The motion of spool 114 interrupts the normal connection between conduits 48 and 50 thereby removing the external pressure source from servo valve No. 1. Simultaneously pressure is lost in chamber 122 of the left hand cylinder by-pass valve permitting spool 124 to move under the influence of spring 126 thus permitting direct communication of both halves of cylinder 12 by way of conduits 44, 86, 41, 42. As a result hydraulic system No. 1 may be completely removed as a means of control over piston rod 10 while system No. 2 is permitted to operate in normal manner. The conduits 50, 50 to the failure removal valves are provided with a hydraulic interlock arrangement so that should either spool 114 or 116 operate when a failure occurs, then that spool will remain in the closed position to keep the failed hydraulic system out of the piston rod control circuit.

When one hydraulic system is pressurized before the other, a condition which may readily occur if independent sources of pressure are utilized, it is necessary that the monitor be disabled or it will react as if an internal failure has taken place and thereby prevent successful pressurization of the second system. This disabling function is provided for by the monitor shut-off valve which consists of a spool 132 located between 130, 130, which are separately connected by conduits 128, 128 to supply lines 48, 48. Springs 134, 134 and washers 136, 136, located in the chambers 130, 130, are so arranged that motion of spool 132 is prevented unless the magnitude of the pressure difference between chambers 130—130 is large enough to overcome the spring preloads. Thus when either system is shut off the pressure difference moves the spool in corresponding direction, thus closing off conduits 52, 54 and thereby preventing operation of the failure detection valve. As the second system is pressurized the spool 132 will open before the two supply pressures are equal, but by suitable selection of the preload of springs 134, 134 with respect to the preload of springs 66, 66 the monitor will not be permitted to operate. The monitor shut off valve will operate whenever either spool 114 or 116 operates in response to an internal malfunction due to the loss of pressure in one of the conduits 48. By providing suitable controlled leakage devices in chambers 60 and 62 the failure detection valve will then recenter and depressurize the monitor servo valve, but the hydraulic interlocks at the failure removal valve will continue to withhold pressure from the malfunctioned hydraulic system. The monitoring action of the apparatus may conveniently be reset by depressurizing the external hydraulic system which removes the hydraulic interlock. This reset capability facilitates the testing of the apparatus by insertion at will of simulated malfunctions.

I claim:

1. A hydraulic actuation system comprising generally in combination, hydraulic circuitry and a plurality of individually operative components arranged to be normally all operating, and a monitor system normally inoperative, command signal input means connected to all of said components whereby the latter are normally reactive thereto in similar fashion, a fluid motor connected to each of said components, a power output member common to all of said motors for movement in response to the cumulative effect thereof, each component including a servo control valve and a mechanical feed back interconnecting the power output member to the input of the servo control valve, said monitor system comprising a reference device to detect failure of any of said components, said monitor system including a failure removal valve corresponding to each of said components and a member displacing on failure of one of said components to match the output pressure of the others of said components whereby said monitor system is responsive to a pressure differential received from said components and operates automatically to divert the primary pressure from said components to the corresponding failure removal valve, said removal valves being connected to compare the pressure outputs of said components with said reference device and to close off the pressure supply from the failing component.

2. A hydraulic actuation system comprising generally in combination, hydraulic circuitry and a plurality of individually operative components arranged to be normally all operating, and a monitor system normally inoperative, command signal input means connected to all of said components whereby the latter are normally reactive thereto in similar fashion, a fluid motor connected to each of said components, a power output member common to all of said motors for movement in response to the cumulative effect thereof, each component including a servo control valve and a mechanical feed back interconnecting the power output member to the input of the servo control valve, said monitor system comprising a reference device to detect failure of any of said components, said monitor system including a failure removal valve corresponding to each of said components and a member displacing on failure of one of said components to match the output pressure of the others of said components whereby said monitor system is responsive to a pressure differential received from said components and operates automatically to divert the primary pressure from said components to the corresponding failure removal valve, said removal valves being connected to compare the pressure outputs of said components with said reference device and to close off the pressure supply from the failing component, and a monitor system shut-off valve spool pressured at its opposite ends from the separate servo-control valve supply systems and displaceable in response to pressure differences therein to deactivate the failure removal valve of the lower pressure system.

3. A hydraulic actuation system comprising generally in combination, hydraulic circuitry, a plurality of individually operative components arranged to be normally all operating, and a monitor system normally inoperatibe, command signal input means connected to all of said components whereby the latter are normally reactive thereto in similar fashion, a fluid motor connected to each of said components, a power output member common to all of said motors for movement in response to the cumulative effect thereof, each component including a control valve, a mechanical feed back interconnecting the power output member to the input of the control valve, said monitor system comprising a reference device to detect failure of any of said components, said monitor system including a plurality of removal valves each corresponding to one of said components and a member displacing on failure of one of said components to match the output pressure of the others of said components whereby said monitor system is responsive to a pressure differential received from said components and operates automatically to divert the primary pressure from said components to the corresponding failure removal valve, said removal valves being connected to compare the pressure outputs of said components with said monitor and to close off the pressure supply source to the failing component.

4. A hydraulic actuation system comprising generally in combination, hydraulic circuitry and a plurality of individually operative components arranged to be normally all operating, and a monitor system, command signal input means connected to all of said components whereby the latter are normally reactive thereto in similar fashion, a fluid motor connected to each of said components, a power output member common to all of said motors for movement in response to the cumulative effect thereof, each component including a servo control valve, a mechanical feed back interconnecting the power output to the input of the servo control valve, a separate hydraulic pressure supply for each of said components, said monitor system comprising a reference device to detect failure of any of said components, said monitor system including a failure removal valve corresponding to each of said components and a member displacing on failure of one of said components to match the output pressure of the others of said components whereby said monitor system is responsive to a pressure differential received from said components and operates automatically to divert the primary pressure from said components to the corresponding failure removal valve, said removal valve being connected to compare the pressure outputs of said components with said reference device and to close off the pressure supply source from the failing component, and a monitor system shut-off valve spool pressured at its opposite ends from the separate servo-control valve supply systems and displaceable in response to pressure differences therein to deactivate the failure removal valve of the lower pressure system, and a bypass valve associated with each of said fluid motors and operable to free the action thereof when disabled.

5. A hydraulic actuation system comprising generally in combination, hydraulic circuitry and a plurality of individually operative components interconnected and arranged to be normally all operating and a monitor system normally inoperative, a fluid motor connected to each of said components, a power output member common to all of said motors for movement in response to the cumulative effect thereof, each component including a pilot valve and a power control valve, and a mechanical feed back interconnecting the power output member to the pilot valve, command signal input means connected to all of said components through corresponding pilot valves whereby the latter are normally reactive to the input signals in similar fashion, said monitor system comprising a reference device to detect failure of any of said components, aid monitor system including a member displacing on failure of one of said components to match the output pressure of the others of said components whereby said monitor system is responsive to a pressure differential received from said components and operates automatically to close off the pressure supply source to the failing component.

6. A hydraulic actuation system comprising generally in combination, hydraulic circuitry and a plurality of individually operative components interconnected and arranged to be normally all operating and a monitor system normally inoperative, a fluid motor connected to each of said components, a power output member common to all of said motors for movement in response to the cumulative effect thereof, each component including a pilot valve and a power control valve, and a mechanical feed back interconnecting the power output member to the pilot valve, command signal input means connected to all of said components through corresponding pilot valves whereby the latter are normally reactive to the input signals in similar fashion, said monitor system comprising a reference device to detect failure of either of said components, said monitor system including a member displacing on failure of one of said components to match the output pressure of the others of said components whereby said monitor system is responsive to a pressure differential received from said components and operates automatically to close off the pressure supply source to the failing component, and a cylinder by-pass valve associated with each of said actuating cylinders and operable to free the action thereof when disabled.

7. In a hydraulic actuator, a pair of fluid motors, each including a cylinder and a movable member therein, a common power output member connected to said movable members for movement thereby, fluid source means supplying pressurized fluid for the actuator, a hydraulic system for connecting each fluid motor to said fluid source means, each hydraulic system including a pair of conduits connected to a respective one of said cylinders on opposite sides of the movable member therein, power control valve means interposed between said fluid source means and said conduits and having a normal position blocking fluid flow to said fluid motor through either of said conduits, a pair of variable capacity fluid passageways connected to said fluid source means, pilot valve means connected with said variable capacity fluid passageways and movable between a normal position establishing substantially equal flow through said passageways and positions other than normal establishing differential flow through the passageways, command signal input means connected with said pilot valve to move the same out of its normal position, means connected to said passageways and responsive to differential pressures existing therein to move said power control valve means to connect one of said conduits, to the exclusion of the other, to said fluid source means, resilient means connecting said pilot valve means to said power output member and opposing movement of said pilot valve means as occasioned by said command signal input means, whereby the net force exerted on the pilot valve means is a measure of the difference between the actual and desired positions of the power output member, and means responsive to the fluid pressure supplied to the associated cylinder opposing movement of said power control valve means occasioned by movement of said pilot valve means, whereby the energy supplied to the two fluid motors is balanced between the two hydraulic systems.

8. In a hydraulic actuator, a pair of fluid motors, each including a cylinder and a movable member therein, a common power output member connected to said movable members for movement thereby, fluid source means supplying pressurized fluid for the actuator, a hydraulic system for connecting each fluid motor to said fluid source means, each hydraulic system including a pair of conduits connected to a respective one of said cylinders on opposite sides of the movable member therein, power control valve means interposed between said fluid source means and said conduits and having a normal position blocking fluid flow to said fluid motor through either of said conduits, a pair of variable capacity fluid passageways connected to said fluid source means, pilot valve means connected with said variable capacity fluid passageways and movable between a normal position establishing substantially equal flow through said passageways and positions other than normal establishing differential flow through the passageways, command signal input means connected with said pilot valve to move the same out of its normal position, means connected to said passageways and responsive to differential pressures existing therein to move said power control valve means to connect one of said conduits, to the exclusion of the other, to said fluid source means, resilient means connecting said pilot valve means to said power output member and opposing movement of said pilot valve means as occasioned by said command signal input means, whereby the net force exerted on the pilot valve means is a measure of the difference between the actual and desired positions of the power output member, and means responsive to the fluid pressure supplied to the associated cylinder opposing movement of said power control valve means occasioned by movement of said pilot valve means, whereby the energy supplied to the two fluid motors is balanced between the two hydraulic systems, a monitor system for disconnecting either of said hydraulic systems from the fluid source means upon failure of one of such hydraulic systems, said monitor system including: a pair of variable capacity fluid passageways, normally closed failure detection valve means connecting the last mentioned passageways to said fluid supply source, a pair of normally open removal valves, one interposed between each hydraulic system and the fluid source means, a pilot valve means connected to the last mentioned passageways and movable betwen a normal position to establish substantially equal flow through the passageways and positions other than normal to establish differential flow through the passageways, means connected with corresponding sides of said fluid motors to detect an abnormal pressure differential therebetween indicating failure of one of said hydraulic systems and also connected to said failure detection valve to connect the passageway of the monitor system to the fluid source means in response to such abnormal pressure differential, power control valve means operated by pressure differential in said last passageways tending to move both of said removal valves to closed position; and conduit means connecting said corresponding sides of the fluid motors to oppose movement of the corresponding removal valves to closed position, whereby the removal valve of the operative hydraulic system will remain open and that of the system having failed will close.

9. A hydraulic actuation system comprising generally in combination, hydraulic circuitry and a plurality of individually operative components arranged to be normally all operating, command signal input means connected to all of said components whereby the same will normally react thereto in similar fashion, a fluid motor connected to each of said components, a power output member common to all of said motors for movement in response to the cumulative effect thereon, each component including a servo-control valve and a mechanical feedback interconnecting the power output member to the input of the servo-control valve, said signal input means being effective to operate said servo-control valve to actuate a corresponding fluid motor in either one of two directions of movement thereof, means responsive to the fluid pressure in said fluid motor as supplied thereby by said servo-control valve operating to oppose the movement of the servo-control valve as effected by said signal input means, whereby the energy supplied to all of the fluid motors is equally distributed.

10. The system according to claim 9 including a monitor system which is normally inoperative, said monitor system including a reference device to detect failure of any of said components, a failure removal valve corresponding to each of said components and a member displacing on failure of one of said components to match the output pressure of the others of said components whereby said monitor system is responsive to a pressure differential received from said components and operates automatically to divert the primary pressure from said components to the corresponding failure removal valve, said removal valves being connected to compare the pressure outputs of said components with said reference device and to close off the pressure supply from the failing component.

References Cited in the file of this patent

UNITED STATES PATENTS

| | | |
|---|---|---|
| 2,597,361 | Mott | May 20, 1952 |
| 2,597,419 | Westbury et al. | May 20, 1952 |
| 2,597,420 | Westbury | May 20, 1952 |

UNITED STATES PATENT OFFICE

CERTIFICATE OF CORRECTION

Patent No. 2,995,014                                                  August 8, 1961

Raymond H. Horky et al.

It is hereby certified that error appears in the above numbered patent requiring correction and that the said Letters Patent should read as corrected below.

Column 1, line 60, strike out "which", second occurrence; line 61, for "air" read -- aid --; same column 1, line 64, for "machining" read -- matching --; column 3, line 23, after "that" insert -- at --; line 25, for "ta" read -- at --; column 4, line 11, after "cause" insert -- a --; line 27, for "sourc" read -- source --; column 6, line 65, for "aid" read -- said --; column 8, line 27, strike out "a"; line 28, for "betwen" read -- between --.

Signed and sealed this 23rd day of January 1962.

(SEAL)
Attest:

ERNEST W. SWIDER                                          DAVID L. LADD
Attesting Officer                                             Commissioner of Patents